United States Patent
Calabro et al.

(10) Patent No.: US 8,845,886 B2
(45) Date of Patent: Sep. 30, 2014

(54) FUNCTIONALIZED FILTERS FOR HEAVY OIL UPGRADING

(75) Inventors: David C. Calabro, Bridgewater, NJ (US); Dennis G. Peiffer, Annandale, NJ (US); Benjamin A. McCool, Naples, FL (US); Stanley E. Jakubowicz, Bath, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 211 days.

(21) Appl. No.: 13/472,832

(22) Filed: May 16, 2012

(65) Prior Publication Data

US 2012/0298558 A1    Nov. 29, 2012

Related U.S. Application Data

(60) Provisional application No. 61/488,483, filed on May 20, 2011.

(51) Int. Cl.
| | |
|---|---|
| *C10G 31/09* | (2006.01) |
| *B01D 39/00* | (2006.01) |
| *B01D 39/14* | (2006.01) |
| *B01D 39/20* | (2006.01) |
| *C08L 79/08* | (2006.01) |
| *C08G 73/10* | (2006.01) |

(52) U.S. Cl.
CPC ......... *C08L 79/08* (2013.01); *C10G 2300/1033* (2013.01); *C10G 31/09* (2013.01); *B01D 39/2068* (2013.01); *C10G 2300/208* (2013.01); *C08G 73/1082* (2013.01)
USPC ........... 208/308; 208/309; 210/348; 210/483; 210/490; 427/244

(58) Field of Classification Search
CPC ........ C08L 79/08; B01D 23/00; B01D 37/00; B01D 39/00; B01D 39/14; B01D 39/2068; B01D 2239/04; B01D 2239/0414; B01D 2239/0471; B01D 2239/0478; C08G 10/00; C08G 73/00; C08G 73/02; C08G 73/026; C08G 73/10; C08G 73/1082; C10G 31/09

USPC ................... 208/308, 309; 210/348, 483, 490; 427/244

See application file for complete search history.

(56) References Cited

U.S. PATENT DOCUMENTS

| | | | |
|---|---|---|---|
| 6,497,747 B1 | 12/2002 | Ding et al. | |
| 2009/0107908 A1 | 4/2009 | Polotskaya et al. | |
| 2009/0163347 A1* | 6/2009 | Shah et al. | 502/21 |

FOREIGN PATENT DOCUMENTS

| | | |
|---|---|---|
| WO | 2008021070 A2 | 2/2008 |
| WO | 2010053549 A1 | 5/2010 |

OTHER PUBLICATIONS

Vrancken, et al., Surface Modification of Silica Gels with Aminoorganosilanes, 1995, Colloids and Surfaces, vol. 98, pp. 235-241.*
International Search Report and Written Opinion of PCT/US2012/038072 dated Jan. 17, 2013.

* cited by examiner

*Primary Examiner* — Walter D Griffin
*Assistant Examiner* — Derek Mueller
(74) *Attorney, Agent, or Firm* — David M. Weisberg

(57) ABSTRACT

This invention relates to a process for separating a hydrocarbon stream via a filtration process to produce an upgraded permeate stream with decreased Conradson Carbon Residue ("CCR") content. The invention involves the modification of a porous ceramic filter by functionalizing the surface of the ceramic filter with an multi-ring aromatic-diimide polymer. Preferably, the multi-ring aromatic-diimide polymer is comprised of a multi-ring aromatic monomer component. The functionalized filters of the present invention can be used in a process to selectively separate components of a hydrocarbon stream to produce an improved permeate (or "filtrate") product stream with a lower CCR content and improved processing capabilities. The functionalized filters of the present invention are particularly beneficial in filtration processes for upgrading heavy hydrocarbon feedstreams, such as whole crudes, topped crudes, synthetic crude blends, shale oils, oils derived from bitumens, oils derived from tar sands, atmospheric resids, vacuum resids, or other heavy hydrocarbon streams.

13 Claims, 6 Drawing Sheets

Schematic of Reaction Mechanism of Example 1

Schematic of Reaction Mechanism of Example 1

FTIR of Functionalized Ceramic Membrane of Example 1

Schematic of Amine Functionalization of Ceramic Surfaces

Simulated Distillation of Feed Sample from Example 4

Performance Test Results (Flux v. CCR Selectivity)
from Example 4

FUNCTIONALIZED FILTERS FOR HEAVY OIL UPGRADING

CROSS-REFERENCE TO RELATED APPLICATIONS

This application claims priority to U.S. Ser. No. 61/488,483, filed May 20, 2011, herein incorporated by reference in its entirety.

FIELD OF THE INVENTION

This invention relates to a process for separating a hydrocarbon stream via a filtration process to produce an upgraded permeate stream with decreased Conradson Carbon Residue ("CCR") content. The invention involves the modification of a porous ceramic filter by functionalizing the surface of the ceramic filter with a multi-ring aromatic-diimide polymer. Preferably, the multi-ring aromatic-diimide polymer is comprised of a multi-ring aromatic monomer component. The functionalized fillers of the present invention can be used in a process to selectively separate components of a hydrocarbon stream to produce an improved permeate (or "filtrate") product stream with a lower CCR content and improved processing capabilities. The functionalized filters of the present invention are particularly beneficial in filtration processes for upgrading heavy hydrocarbon feedstreams, such as whole crudes, topped crudes, synthetic crude blends, shale oils, oils derived from bitumens, oils derived from tar sands, atmospheric resids, vacuum resids, or other heavy hydrocarbon streams.

BACKGROUND OF THE INVENTION

As the demand for hydrocarbon-based fuels has increased, the need for improved processes for separating hydrocarbon feedstocks of heavier molecular weight has increased as well as the need for increasing the conversion of the heavy portions of these feedstocks into more valuable, lighter fuel products. These heavier, "challenged" feedstocks include, but are not limited to, low API gravity, high viscosity crudes from such areas of the world as the Middle East, Mexico, Venezuela, and Russia, as well as less conventional refinery feedstocks derived from such sources as bitumen, shale oil and tar sands. It is also important that heavy crude fractions, such as atmospheric resids, vacuum resids, and other similar intermediate feedstreams containing boiling point materials above about 950° F. are processed in such a manner so as to improve their ability to be utilized as feedstreams for subsequent refining and petrochemical processes such as, but not limited to, fuels blending, fuels upgrading, catalytic conversion, steam cracking, and lube oils production and upgrading.

Most crude oils and synthetic crude oils derived from such raw materials as bitumen, shale oil and tar sands are processed through initial separations units such as a crude unit that are designed to boil and distill lighter boiling point fractions from the heavier boiling point crude fractions. The majority of these boiling point fractions are sent to other refinery and petrochemical processes for further refinement depending upon their molecular content characteristics, while a smaller amount of these crude unit fractions are sent to finished product treatment and/or product blending.

One problem that exists is that these conventional separations units require a significant amount of energy to generate these distillation based separations. Most crude units have at least one atmospheric distillation train and at least one vacuum distillation train. Often crude units also have additional crude intermediate or auxiliary distillation trains. Each of these unit trains require the hydrocarbon feed to the train to be heated to temperatures of about 750° F. to about 85° F. prior to entering a distillation column associated with each train. In turn, each of these distillation columns normally requires multiple reflux circuits and possible intermediate column reheat circuits in order to properly control and achieve proper separation of the individual fractions obtained from the distillation. Not only does this arrangement require a significant amount of equipment and associated capital and maintenance costs, but these conventional processes require large amounts of input energy as well as a large array of sophisticated controls and skilled personnel for proper operation.

In a typical refining unit, a significant portion of the bottoms product stream from the crude atmospheric distillation train is sent for further processing in a crude vacuum distillation train, This atmospheric bottoms stream is typically high in both asphaltene content and CCR content. The vacuum distillation train can separate out some of the asphaltene content and CCR via distillation at high temperatures under vacuum conditions, but this process is costly to operate. Additionally, as existing refineries are processing heavier crude feedstocks, Which are more available and lower cost than the currently dwindling lighter crude feedstocks, these existing vacuum distillation trains cannot process all of the atmospheric bottoms produced.

Efforts therefore have been initiated by refiners to find alternate processing methods for upgrading heavy oils, such as atmospheric bottoms streams, in order to divert some of the processing away from these overloaded vacuum distillation trains. As is expected, it is also desired if these alternate methods are lower in cost to operate than conventional distillation processes.

Filtration of heavy crudes, if made viable, is an attractive alternative to vacuum distillation due to the significant reduction in heat energy requirements (due to not requiring boiling of the hydrocarbon streams for distillation) as well as the elimination of performing operations under a vacuum as required by current distillation technologies.

The problem in the current art is to develop low energy filtration systems for producing lower CCR content crude products that have high enough filtrate (or "permeate") flow capacities while maintaining significant CCR removal efficiencies to rival the economics of conventional thermal distillation techniques, thus making such filtration processes economically viable alternatives.

SUMMARY OF THE INVENTION

This invention includes a process for separating a hydrocarbon stream via filtration processes to produce an upgraded permeate stream with decreased Conradson Carbon Residue ("CCR") content. The invention involves the modification of a porous ceramic filter by functionalizing the surface of the ceramic filter with a multi-ring aromatic-diimide polymer that increases the overall separations efficiency of the filtration system. Preferably, the multi-ring aromatic-diimide polymer is comprised of a multi-ring aromatic monomer component.

Although one preferred embodiment of this invention is for upgrading atmospheric crudes streams, thereby reducing the process load on existing or new vacuum distillation units, this invention can be used to produce a permeate stream with improved (i.e. reduced) CCR content from any hydrocarbon containing stream containing asphaltenes or high molecular weight aromatic compounds. As such, this invention includes a filtration process for separating a hydrocarbon containing stream to produce a permeate product stream with reduced CCR content utilizing the functionalized ceramic filters of the present invention. In more preferred embodiments, this invention may be utilized to separate heavy hydrocarbon feedstreams, such as whole crudes, topped crudes, synthetic crude blends, shale oils, oils derived from bitumens, oils derived from tar sands, atmospheric resids, vacuum resids, or other heavy hydrocarbon streams to produce a permeate product stream with reduced CCR content utilizing the functionalized ceramic filters of the present invention. By the equivalent terms "heavy hydrocarbon feedstreams" or "heavy oils" as utilized herein, it is meant hydrocarbon containing streams with a final boiling point above at least 950° F.

In a preferred embodiment herein is a functionalized filter comprised of a) a polymer comprised of multi-ring aromatic imides, multi-ring aromatic diimides or a combination thereof; and b) a ceramic filter element; wherein at least a portion of the multi-ring aromatic imides or multi-ring aromatic diimides are chemically linked to the ceramic filter element via siloxane groups.

Preferably, at least a portion of the multi-ring aromatic imides or multi-ring aromatic diimides are chemically linked to the siloxane groups of the ceramic filter element via an organo-amine anchoring monomer. Even more preferably, the organo-amine anchoring monomer is one or more aminosiloxane reagents selected from the group consisting of aminoalkyl trialkoxysilane, aminoalkyl methyldialkoxysilane, aminoalkyl dimethylalkoxysilane, N-(2-aminoethyl)-aminoalkyltrialkoxysilane, N-(2-aminoethyl)-(aminoalkyl) methyldialkoxysilane, N-(2-aminoethyl)-(aminoalkyl) dimethylalkoxysilane, diethylenetriaminedimethylalkoxysilane, diethylenetriaminemethyldialkoxysilane, diethylenetriaminedimethylalkoxysilane, aminophenyltrialkoxysilane, aminophenylmethyldialkoxysilane, aminophenyldimethylalkoxysilane, wherein the aminoalkyl and alkoxy groups have 1 to 20 carbon atoms in either linear, branched, or cyclic structures, the aminoaryl group is selected from aminophenyl, aminobenzyl, and amioalkylphenyl, and the amine is selected from primary amines and secondary amines.

In other preferred embodiments, the polymer is comprised of multi-ring aromatic diimides and the multi-ring aromatic diimides are resultant from the condensation reaction of an organic linker molecule with multi-ring aromatic dianhydrides selected from the group consisting of perylene-3,4,9,10-tetracarboxylic dianhydride; phenanthrene-1,8,9,10-tetracarboxylic dianhydride; 2,3,6,7-naphthalene tetracarboxylic dianhydride; 1,2,5,6-naphthalene tetracarboxylic dianhydride; 1,4,5,8-naphthalene tetracarboxylic dianhydride; 2,2',3,3'-biphenyl tetracarboxylic dianhydride; and 2,3,3',4'-biphenyl tetracarboxylic dianhydride.

In a preferred embodiment is a method for making the functionalized filter comprising the steps of: a) surface grafting one or more organo-amine anchoring monomers onto the surface of a ceramic filter element to create amine grafted sites; b) reacting the grafted amine sites with either a multi-ring aromatic anhydride or a multi-ring aromatic dianhydride to form a multi-ring aromatic aromatic acid which is chemically attached to the surface of the ceramic filter element; and c) curing the composition resulting from step b) at sufficiently high temperature to achieve conversion of the amic acid linkages to imide linkages.

Preferably, the grafted amine sites in step b) are reacted with the multi-ring aromatic dianhydride and further one or more diamines forming a surface-attached polyamic acid to the surface of the ceramic filter element via the grafted amine sites. In another preferred embodiment, at least one of the organo-amine anchoring monomers is an aminosiloxane reagent.

In a preferred embodiment, at least one diamine is selected from the group consisting of hexamethylene diamine, phenylene diamine, methylene dianiline, methylene di-o-chloroaniline, 2,3,5,6-tetramethyl-1,4-phenylene diamine, methylene di-o-chloroaniline, methylene bis(dichloroaniline), methylene dichlorocyclohexylamine, 4,4-(hexafluoroisopropylidene)-bisaniline, 3,3'-diaminophenyl sulfone, 4,4'-diaminophenyl sulfone, 2,4-diamino cumene, methyl bis(di-o-toluidine), oxydianiline, bisaniline A, bisaniline P, bisaniline M, 2,2-bis[4-(4-aminophenoxy)phenyl]propane, 4,4'-bis(4-aminophenoxy)biphenyl, diaminocyclooctane, tetramethylenediamine, hexamethylenediamine, octamethylenediamine, decamethylenediamine, aminomethylcyclooctylmethanamine, 1,5-diaminonaphthalene, 1,8-diaminonaphthalene, 4,4'-diaminodiphenylsilane, 2,2'-bis(trifluoromethyl)benzidine, 1,2-diaminobenzene, 1,3-diaminobenzene, 1,4-diaminobenzene, 2,5-dimethyl-1,4-diaminobenzene, 2-(trifluoromethyl)-1,4-phenylenediamine, 5-(trifluoromethyl)-1,3-phenylenediamine, 4,4'-diaminobenzophenone, 3,4'-diaminobenzophenone, 3,3'-diaminobenzophenone, xylylene diamine, 4-aminophenyl-3-aminobenzoate, 2,4-diaminatoluene, 2,5-diaminotoluene, 2,6-diaminotoluene, 2,4-diamino-6-chlorotoluene, 4-chloro-1,3-phenylenediamine, 2,4,6-trimethyl-1,3-diaminobenzene, 2,2'-bis-(4-phenoxy aniline)isopropylidene, 4,4'-trifluoromethyl-2,2'-diaminobiphenyl, 4,4-thio-bis-[(2-trifluoromethyl)benzene amine, 9,9-bis(4-aminophenyl)fluorene, 1,3-diamino-2,4,5,6-tetrafluorobenzene, 4,4'-diaminobenzanilide, o-tolidine sulfone, o-tolidine disulfonic acid, 4,4'-diamino-3,3'-dicaarboxy-dipbenyl methane, 9,9'-bis(4-aminophenyl)fluorene, diaminodurene, 3,3'5,5'-tetramethylbenzidine, and 1,3-diamino-2,4,5,6-tetrafluorobenzene.

In a more preferred embodiment, the aminosiloxane reagent is selected from the group consisting of aminoalkyl trialkoxysilane, aminoalkyl methyldialkoxysilane, aminoalkyl dimethylalkoxysilane, N-(2-aminoethyl)-aminoalkyltrialkoxysilane, N-(2-aminoalkyl)-(aminoalkyltrialkoxysilane, N-(2-aminoethyl)-(aminoalkyl) dimethylalkoxysilane, diethylenetriaminetrialkoxysilane, diethylenetriaminemethyldialkoxysilene, diethylenetriaminedimethylalkoxysilane, aminophenyltrialkoxysilane, aminophenylmethyldialkoxysilane, aminophenyldimethylalkoxysilane, wherein the aminoalkyl and alkoxy groups have 1 to 20 carbon atoms in either linear, branched, or cyclic structures, the aminoalkyl group is selected from aminophenyl, aminobenzyl, and aminoalkylphenyl, and the amine is selected from primary amines and secondary amines.

In another preferred embodiment herein, the functionalized filters as disclosed and described are utilized in a process for separating a heavy hydrocarbon comprised of: a) contacting a first side of a functionalized filter located in a filtration unit with a heavy hydrocarbon stream having a final boiling point above 950° F.; b) obtaining a permeate from a second side of the functionalized filter, wherein the permeate has passed from the first side of the functionalized filter to the second side of the functionalized filter by passing the permeate components through the functionalized filter, and wherein the permeate has a lower CCR content than the heavy hydrocarbon stream; and c) obtaining a retentate from the first side of the functionalized filter, wherein the retentate has a higher CCR content than the heavy hydrocarbon stream; wherein the functionalized filter is comprised of a ceramic filter element and a polymer layer comprised of multi-ring aromatic imides, multi-ring aromatic diimides, or a combination thereof; and wherein at least a portion of the multi-ring aromatic imides or multi-ring aromatic diimides are chemically linked to the ceramic filter element via siloxane groups; and wherein the permeate components passes through at least a portion of the polymer layer and at least a portion of the ceramic filter element.

DETAILED DESCRIPTION OF THE PREFERRED EMBODIMENTS

Figure 1:
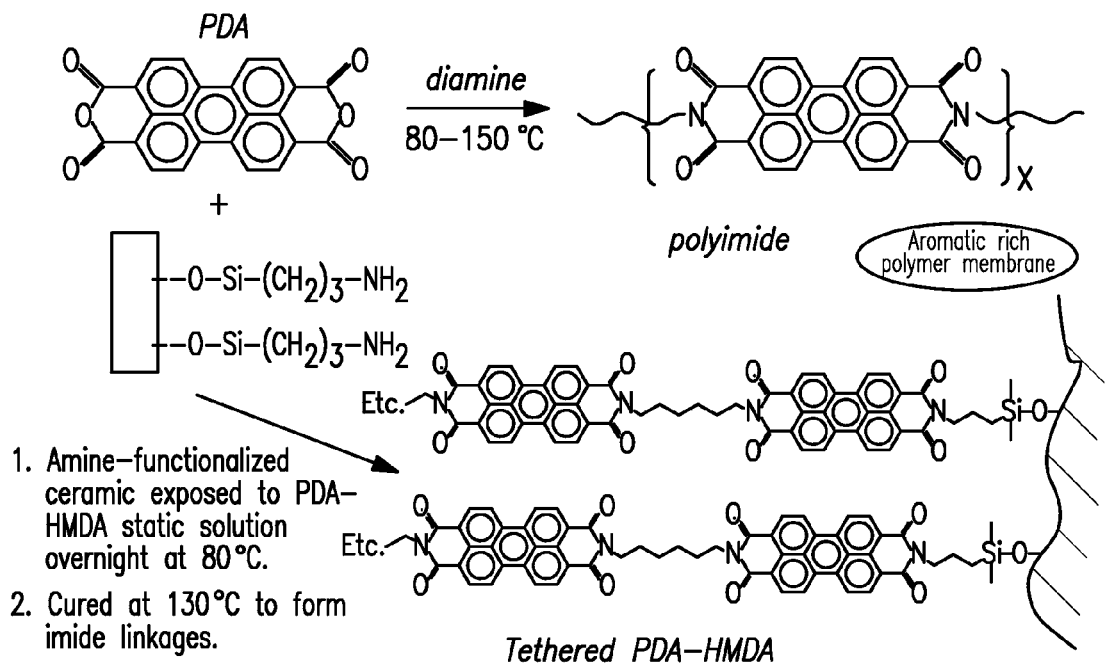
FIG. 1 illustrates the believed mechanism for producing an embodiment of a functionalized ceramic filter of the present invention utilizing a perylene dianhydride ("PDA") monomer and hexamethylenediamine ("HMDA") to form a functionalized polymer surface on a ceramic filter module via siloxane/imide linkages or "anchors" to the ceramic surface of the filter.

This invention includes a process for separating a hydrocarbon containing stream via a filtration process to produce an upgraded permeate stream with decreased Conradson Carbon Reside ("CCR") content. The invention involves the modification of a porous ceramic filter by functionalizing the surface of the ceramic filter with a multi-ring aromatic-diimide polymer that increases the overall separations efficiency of the filtration system. Preferably, the multi-ring aromatic-diimide polymer is comprised of a multi-ring aromatic monomer component. Even more preferably, the multi-ring aromatic-diimide polymer is comprised of multi-ring aromatic diimides that are derived through a reaction of organo-diamine precursors with multi-ring aromatic precursors as described herein.

Although one preferred embodiment of this invention is for upgrading atmospheric crudes streams, thereby reducing the process load on existing or new vacuum distillation units, this invention can be used to produce a permeate stream with improved (i.e., reduced) CCR content from any hydrocarbon containing stream containing asphaltenes or high molecular weight aromatic compounds. The terms "Conradson Carbon Residue" ("CCR") and "Micro Carbon Residue" (or "MCR") as used herein are considered as equivalents and is a measure of carbon content of a sample as measured per test method ASTM D4530.

The present invention includes a filtration process for separating a hydrocarbon containing stream to produce a permeate product stream with reduced CCR content utilizing the functionalized ceramic filters of the present invention, in more preferred embodiments, this invention may be utilized to separate heavy hydrocarbon feedstreams, such as whole crudes, topped crudes, synthetic crude blends, shale oils, oils derived from bitumens, oils derived from tar sands, atmospheric resids, vacuum resids, or other heavy hydrocarbon streams to produce a permeate product stream with reduced CCR content utilizing the functionalized ceramic filters of the present invention. By the equivalent terms "heavy hydrocarbon feedstreams" or "heavy oils" as utilized herein, it is meant hydrocarbon containing streams with a final boiling point above 950° F., It should be noted that the term "ceramic" as utilized herein is defined as any hard, brittle, heat-resistant and corrosion-resistant material made by mixing, shaping and then firing to elevated temperatures a nonmetallic mineral or combination of minerals. Some preferred examples of ceramics and ceramic filter modules that can be used in the present invention include, but are not limited to, monoliths, membranes, tubes, discs, sheets, layered structures, and other geometrical configurations known to those well-versed in the state of the art. Preferred ceramics as used in the present invention are selected from materials comprised from clays, titania, silica, alumina, cordierite, ferric oxide, boron nitride, zirconia, zeolitic materials, glass, SiC, layered mineral structures, kaolinite, earthen ware materials, $SO_2/Fe_2O_3$, composites, layered structures comprising a combination of materials, foamed structures comprising a combination of materials, honey-combed configurations comprising a combination of materials, silicon nitride, sol-gel materials, steatite, porcelain, perovskites, macroporous and mesoporous materials, carbons, mixed matrix materials, and combinations thereof. Most preferably, the ceramics as used in the present invention are selected from materials comprised from clays, titania, silica, alumina, cordierite, ferric oxide, boron nitride, zirconia, zeolitic materials, glass, and SiC.

The present invention discloses functionalized ceramic filters which show improved separations of hydrocarbon streams by producing permeate produce streams with reduced CCR content. By reduced, it is meant that the permeate stream retrieved from the filtration process has a lower CCR content (by wt %) than the hydrocarbon feedstream contacted with the filter. A permeate stream is the (or one of the) stream(s) from a filtration process that is comprised of the part of the feedstream that permeates, or passes, through the selectively porous filter device.

The present invention involves the functionalization of the ceramic filter, or more accurately, the surface of the ceramic filter, with a multi-ring aromatic-diimide polymer to create the "functionalized filters" described in further detail herein. This multi-ring aromatic-diimide polymer coupled with the ceramic filter element exhibits an improved selectivity to reject CCR in the feedstream at comparable permeate flux rates, thereby improving the overall processing of the filtration system on a comparable surface area basis.

Another significant benefit of the present invention is that in the present invention, the porous ceramic filter is functionalized by chemically grafting and/or growing the multi-ring aromatic-diimide polymer onto the surface of the ceramic filter. As such, the resulting polymer layer is not just layered onto the ceramic filter surface, but is chemically bonded with the ceramic surface. As a result, in addition to the improved processing capacity of the functionalized filters of the present invention, the functionalized layer thus produced shows extremely high resistance to wear, material loss, swelling, or solubility when exposed to filtration conditions, including when exposed to heavy oils and contaminants, including those found in typical refining operations even at elevated temperatures.

An exemplary, non-limiting embodiment of the present invention is described as follows. in this embodiment, a multi-ring aromatic dianhydride, such as perylene dianhydride (or "PDA"), is contacted with a diamine, such as hexamethylene-diamine (or "HMDA"), under sufficient reaction condition to form a multi-ring aromatic polyamic acid polymer. The resulting polymer is contacted with an amine-functionalized surface of a ceramic filter and preferably cured at conditions to form the imide linkages between the amine-functionalized ceramic surface and the multi-ring aromatic PDA-HMDA polyamic acid, to form an integrated and stable polyimide polymer on the surface of the ceramic filter. A schematic of the reaction mechanism of this particular embodiment is illustrated in FIG. 1. The particular details for the formation of the functionalized filter of this embodiment are shown in Example 1.

In another embodiment, the multi-ring aromatic dianhydride can be reacted directly with amine-functionalized ceramic to form a surface-decorated functionalized filter. It should be noted however, that the use of a diamine "linker" such as described in the embodiment above has the benefit for the development of higher molecular weight polymer surfaces (degree of polymerization) as well as the ability for more control of the polymer surface properties through the alteration of the diamine "linkers" containing different molecular weights and/or chemical properties.

In another embodiment, a multi-ring aromatic anhydride can be reacted directly with amine-functionalized ceramic to form a surface-decorated functionalized filter. It should be noted that in this instance, the use of a diamine "linker" is not required. Here, the polymer formed on the surface is attached to the amine-functionalized ceramic filter with a "tethering" effect and does not tend to form as dense a polymer surface as when the multi-ring aromatic dianhydrides are utilized with the diamines. In envisioned embodiments, combinations of both multi-ring aromatic dianhydrides and multi-ring aromatic anhydrides may be utilized, preferably with a diamine linking agent, in differing degrees of relative concentrations to control the amount of overall polymerization of the functionalized polymer layer and control the physical and selective separation properties of the polymer layer produced.

In yet another embodiment, the multi-ring aromatic dianhydride can be reacted directly with amine-functionalized ceramic to form a multi-ring aromatic-decorated surface having monoanhydride reactive groups on the surface. In a subsequent step, a mixture of multi-ring aromatic dianhydride and a diamine is reacted with the monoanhydride-functionalized ceramic under sufficient conditions to form a multi-ring aromatic-diamine polyamic acid polymer on the ceramic filter surface. Preferable curing of this product at conditions to convert the amic acid linkages into imide linkages again forms an integrated and stable multi-ring aromatic polyimide polymer on the surface of the ceramic filter.

It should be noted herein that in preferred embodiments, the multi-ring aromatic dianhydrides used in the present invention are comprised of from about 2 to about 10 aromatic rings, more preferably from about 2 to about 8 aromatic rings, and even more preferably from about 2 to about 5 aromatic rings. In preferred embodiments of the present invention, the multi-ring aromatic dianhydrides (aromatic tetracarboxylic dianhydrides) are selected from a group comprising a condensed polycyclic aromatic group, a substituted aromatic group in which the aromatic group is connected to each other directly or via a bridging group or mixtures of any of these. Representative examples include: perylene-3,4,9,10-tetracarboxylic dianhydride; phenanthrene-1,8,9,10-tetracarboxylic dianhydride; 2,3,6,7-naphthalene tetracarboxylic dianhydride; 1,2,5,6-naphthalene tetracarboxylic dianhydride; 1,4,5,8-naphthalene tetracarboxylic dianhydride; 2,2',3,3'-biphenyl tetracarboxylic dianhydride; and 2,3,3',4'-biphenyl tetracarboxylic dianhydride. In a most preferred embodiment, the multi-ring aromatic dianhydrides comprise perylene-3,4,9,10-tetracarboxylic dianhydride.

In other preferred embodiments, the multi-ring aromatic anhydrides used in the present invention are comprised of from about 2 to about 10 aromatic rings, more preferably from about 2 to about 8 aromatic rings, and even more preferably from about 2 to about 5 aromatic rings. In preferred embodiments of the present invention, the multi-ring aromatic anhydrides are selected from a group comprising 2 to 5 multi-ring aromatic anhydrides.

In preferred embodiments, the diamine linkers used in the polymer of the present invention can be either aliphatic or aromatic compounds. In preferred embodiments, the diamine linkers used in the present invention are comprised of from about 2 to about 40 carbon atoms, more preferably from about 4 to about 30 carbon atoms. In preferred embodiments of the present invention, the diamine linkers can be represented by the following: $NH_2-R-NH_2$ where R can represent a divalent aliphatic group, divalent aromatic group, a substituted aliphatic or aromatic group (e.g., aliphatic groups, aromatic groups, halide groups, cyano groups, sulfonate groups, amino groups, or in combinations). In the preferred embodiments of the present invention, the non-limiting examples of diamine linkers are selected from hexamethylene diamine, phenylene diamine, methylene dianiline, methylene di-o-chloroaniline, 2,3,5,6-tetramethyl-1,4-phenylene diamine, methylene di-o-chloroaniline, methylene bis(dichloroaniline), methylene dichlorocyclohexylamine, 4,4'-(hexafluoroisopropylidene)-bisaniline, 3,3'-diaminophenyl sulfone, 4,4'-diaminophenyl sulfone, 2,4-diamino cumene, methyl bis(di-o-toluidine), oxydianiline, bisaniline A, bisaniline P, bisaniline M, 2,2-bis[4-(4-aminophenoxy)phenyl]propane, 4,4'-bis(4-aminophenoxy)biphenyl, diaminocyclooctane, tetramethylenediamine, hexamethylenediamine, octamethylenediamine, decamethylenediamine, aminomethylcyclooctylmethanamine, 1,5-diaminoaphthalene, 1,8-diaminonaphthalene, 4,4'-diaminodiphenylsilane, 2,2'-bis(trifluoromethyl)benzidine, 1,2-diaminobenzene, 1,3-diaminobenzene, 1,4-diaminobenzene, 2,5-dimethyl-1,4-diaminobenzene, 2-(trifluoromethyl)-1,4-phenylenediamine, 5-(trifluoromethyl)-1,3-phenylenediamine, 4,4'-diaminobenzophenone, 3,4'-diaminobenzophenone, 3,3'-diaminobenzophenone, xylylene diamine, 4-aminophenyl-3-aminobenzoate, 2,4-diaminotoluene, 2,5-diaminotoluene, 2,6-diaminotoluene, 2,4-diamino-6-chlorotoluene, 4-chloro-1,3-phenylenediamine, 2,4,6-trimethyl-1,3-diaminobenzene, 2,2'-bis-(4-phenoxy aniline)isopropylidene, 4,4'-trifluoromethyl-2,2'-diaminobiphenyl, 4,4'-thio-bis-[(2-trifluoromethyl]benzene amine, 9,9-bis(4-aminophenyl)fluorene, 1,3-diamino-2,4,5,6-tetrafluorobenzene, 4,4'-diaminobenzanilide, o-tolidine sulfone, o-tolidine disulfonic acid, 4,4'-diamino-3,3'-dicaarboxydiphenyl methane, 9,9'-bis(4-aminophenyl)fluorene, diaminodurene, 3,3'5,5'-tetramethylbenzidine, and 1,3-diamino-2,4,5,6-tetrafluorobenzene. In addition, other possible diamines include divalent cycloaliphatic diamines, divalent aliphatic/aromatic diamines, and divalent aromatic diamines comprising a siloxane group and combinations thereof.

Different molecular weight diamine linkers can be used to vary the properties of the polymer layer achieved. Longer chain diamines may be used to decrease the polymer density resulting in higher flux characteristics for the functionalized filter. Polyamines may be used to create branched, hyperbranched and/or crosslinked polymers when reacted with the dianhydride monomers. Additionally, functionalized diamine linkers may be used to vary the filtration properties of the polymer layer.

The mole ratio of the multi-ring aromatic dianhydrides and the diamine linkers will also affect the extent of polymer growth on the ceramic filter surface. For example, a less than equimolar amount of the diamine linkers used in the functionalization of the ceramic filters can result in a higher extent of tethering wherein the molar excess of multi-ring aromatic dianhydrides will more completely react with the amine groups on the amine-functionalized ceramic filter resulting in shorter polyamic acid segment growth on the ceramic surface by reaction with the diamine linkers. This results in the final functionalized membranes with a higher degree of small groups of diimide monomers or lower molecular weight multi-ring aromatic-diimide polymers on the surface of the ceramic filter. This can provide a high level of selectivity while maintaining a very thin polymer film which can greatly improve the flux rate of a given filter module.

As described herein, the ceramic filters can be functionalized in a manner to provide an amine group chemically attached to the metal oxide surface of the ceramic filter. Two pathways for generating desired multi-ring aromatic functionalized separations to materials are envisioned for obtaining the desired product. One path is the direct reaction of the multi-ring dianhydride (for example, PDA) with a diamine molecule to generate a wide variety of polyimide polymers. A range of diamine compounds can be used in this synthesis, each of which will modify the property-performance relationship. Both aliphatic as well as aromatic structures (and their associated combinations) will have utility in this invention. Preferably, these polymers would consist of a -(-multi-ring diimide-)$_x$- backbone that is rich in the condensed ring aromatic core. As a mimic for multi-ring asphaltenic molecules found in heavy hydrocarbon feeds, these polymers should exhibit a strong attraction for multi-ring aromatics and asphaltenes.

The second pathway involves the reaction of a multi-ring dianhydride (such as PDA) with an amine-functionalized ceramic substrate surface. In this case either multi-ring dianhydride alone or in combination with a diamine (e.g., hexamethylenediamine, HMDA) is reacted with the functionalized surface to produce either a multi-ring diimide decorated surface or a surface-tethered polyimide, respectively. In either case, a multi-ring aromatic rich surface has been created having the ability to act as a selective adsorbent for multi-ring aromatics and asphaltenes.

An exemplary, preferred method for creating the functionalized ceramic filter of the present invention is as follows: A method for making a functionalized filter comprising the steps of: a) surface grafting one or more organo-amine anchoring monomers onto the surface of a ceramic filter to create amine grafted sites; b) reacting the grafted amine sites with a multi-ring aromatic dianhydride to form a multi-ring aromatic amic acid which is chemically attached to the surface of the ceramic filter; and c) curing the composition resulting from step b) at sufficiently high temperature to achieve conversion of the amic acid linkages to imide linkages.

In preferred embodiments, the multi-ring aromatic dianhydride is reacted with one or more diamines either prior to or simultaneous with step b) above to form a high molecular-weight polymer.

In another embodiment, a multi-ring aromatic anhydride can be used in lieu of (or in conjunction with) the multi-ring aromatic dianhydride in the method above, with or without the diamine components. Here, the polymer layer formed on the surface is attached to the amine-functionalized ceramic filter with a "tethering" effect and does not tend to form as dense a polymer surface as when the multi-ring aromatic dianhydrides are utilized with the diamines. In envisioned embodiments, combinations of both multi-ring aromatic dianhydrides and multi-ring aromatic anhydrides may be utilized.

In preferred embodiments, the multi-ring aromatic anhydride, dianhydride, or resulting co-polymer, along with the ceramic filter element, is reacted and cured at temperatures ranging from about 25° C. to about 175° C., at from about 12 to about 30 psia, for a reaction time ranging from about 0.5 hour to about 48 hours, preferably under anhydrous conditions.

Preferred ceramics for use in the filter of the present invention are selected from materials comprised from clays, titania, silica, alumina, cordierite, ferric oxide, boron nitride, zirconia, zeolitic materials, glass, and SiC. It is also preferred that the ceramic filter have a certain pore size distribution. This provides for proper stability of the integrated polymer surface and flow characteristics of the overall separations process. In a preferred embodiment, the ceramic filter element has a pore size cutoff rating from about 2 to about 20 kiloDaltons (kD); and more preferably, the ceramic filter has a pore size cutoff rating from about 5 to about 15 kiloDaltons (kD). In other preferred embodiments, the ceramic filter element has an average pore size from about 0.001 to about 0.020 microns (μm); and more preferably, the ceramic filter element has an average pore size from about 0.002 to about 0.015 microns (μm); and even more preferably, the ceramic filter element has an average pore size from about 0.005 to about 0.010 microns (μm).

Example 1 herein, illustrates a procedure for making an embodiment of the functionalized ceramic filter of the present invention. This procedure results in a functionalized polymer layer reacting with and being chemically bonded to the surface of the ceramic filter. While not wishing to be held to any specific theory, it is believed that the multi-ring aromatic-diimide polymer layer is formed similar to as shown in FIG. 1.

Figure 2:
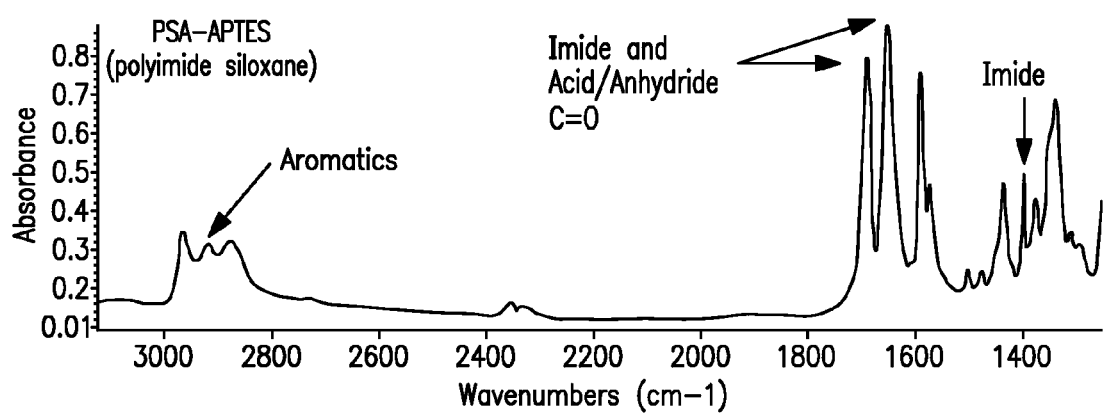
FIG. 2 is a Fourier Transform Infrared Spectroscopy ("FTIR) spectrum of the PDA/HMDA polymer grafted onto the porous silica filter composition.

A Fourier Transform Infrared Spectroscopy ("FTIR) analysis of the same FDA/HMDA polymer grafted onto the porous silica filter composition is shown in FIG. 2. This data indicates the presence of strong aromatic and imide absorption bands which confirms the anticipated polymer growth reactions on the surface of the silica element. The lack of NH vibrations in the spectrum also indicates that essentially all of the free amines have reacted to form imide amic acid species.

Figure 3:
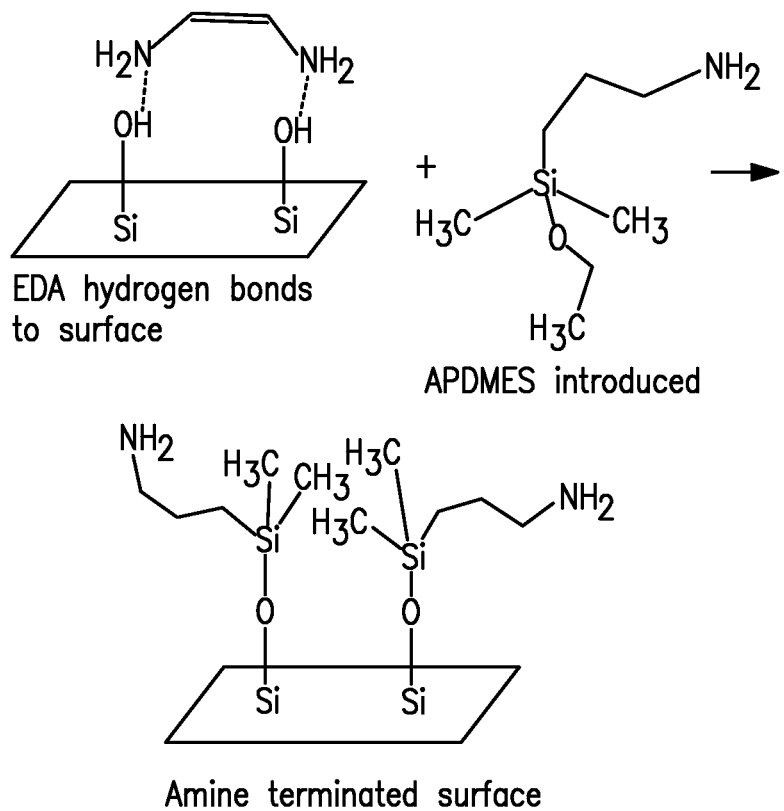
FIG. 3 illustrates an embodiment of the present invention for surface functionalization of a ceramic filter surface with reactive amine groups which surface grafting step can be performed prior to exposing the ceramic filter to the multi-ring aromatic dianhydride/diamine polymer.

In another embodiment of the present invention, the surface of a ceramic filter may first be functionalized with reactive amine groups before exposing it to the multi-ring aromatic dianhydride/diamine polymer. In this embodiment, an amine (preferably a diamine) is utilized to catalyze a reaction between the SiOH groups of the ceramic filter with an aminosiloxane, as illustrated in FIG. 3. A shown in FIG. 3, a diamine (ethylenediamine, "EDA") is used to catalyze the reaction of an aminosiloxane (aminopropyldimethylethoxysilane, or "APDMES") to "amine-functionalize" (or "amine surface graft") to pre-functionalize the surface of the ceramic filter. Here, the result is an amine terminated functionalized surface for the ceramic filter. This amine-functionalized ceramic filter can then more readily be reacted with the multi-ring aromatic polymers in the presence or absence of the diamine linker agents.

An embodiment of a functionalized ceramic filter of the present invention was tested under the same conditions as the same ceramic filter in the unmodified condition in Example 2.

Figure 6:
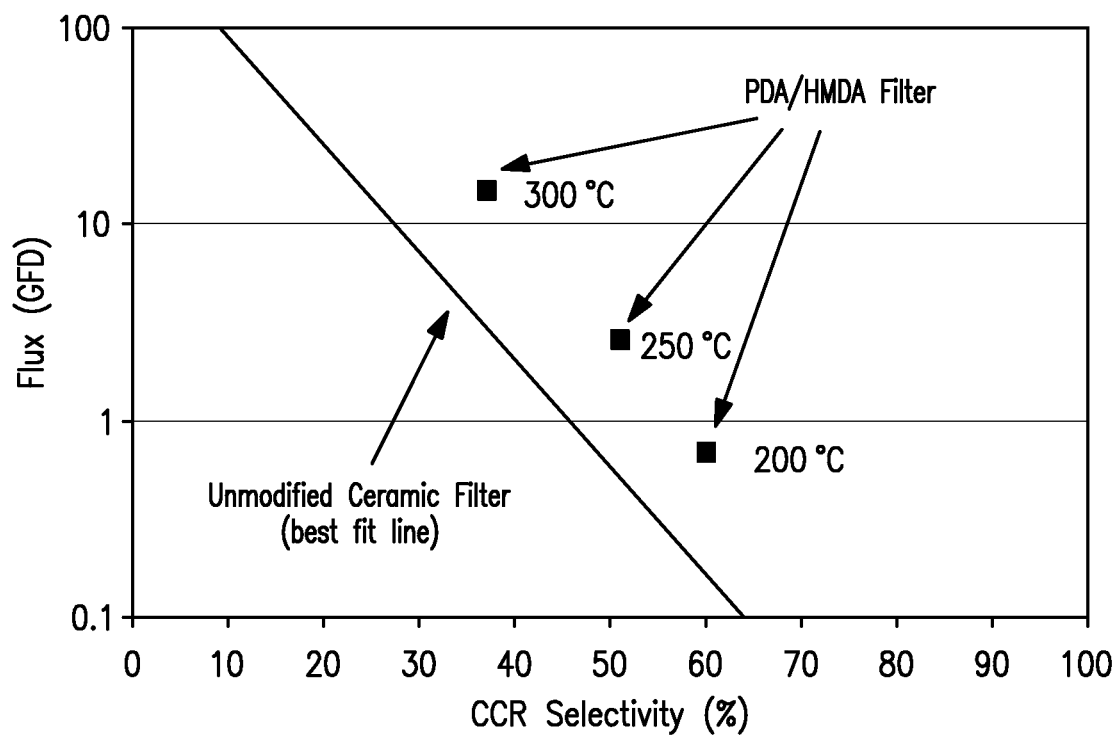
FIG. 6 shows comparative results of separations performance testing of a PDA/HMDA functionalized ceramic filter of the present invention as compared to an unmodified ceramic filter in separating hydrocarbon feedstreams.

FIG. 6 herein shows that the functionalized ceramic filter of the present invention provided better performance than the unmodified ceramic filter under all conditions tested. The relative increase in selectivity of the functionalized filter over the unmodified filter ranged from about 68% at 300° C. to 27% at 200° C.

The functionalized ceramic filters of the present invention are preferably utilized in filtration processes for the upgrading of heavy oils. As such, this invention includes a filtration process for separating a heavy hydrocarbon stream to produce a permeate stream with improved characteristics, including a reduced CCR content. In preferred embodiments, this invention may be utilized to separate heavy hydrocarbon feedstreams, such as whole crudes, topped crudes, synthetic crude blends, shale derived oils, oils derived from bitumens, oils derived from tar sands, atmospheric resids, vacuum resids, or other heavy hydrocarbon streams.

Unless otherwise noted, the term "hydrocarbon feedstream" or "hydrocarbon stream" as used herein is defined as a fluid stream that is comprised at least 80% hydrocarbon containing compounds by weight percentage. Unless otherwise noted, the term "heavy hydrocarbon" or "heavy hydrocarbon feedstream" as used herein is defined as a hydrocarbon containing composition wherein the final boiling point is above 950° F.

Figure 4:
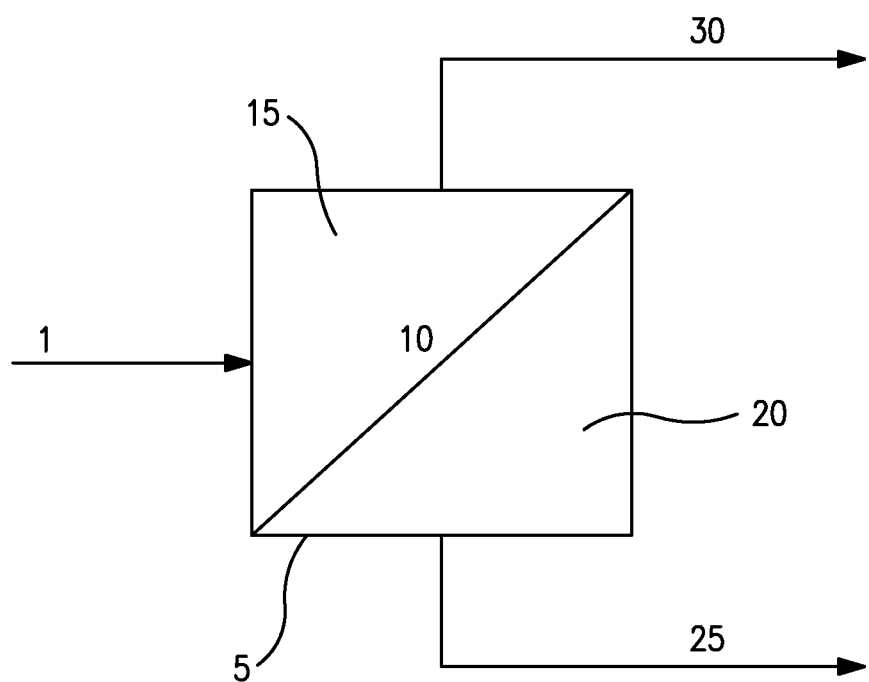
FIG. 4 illustrates an embodiment of the present invention utilizing a functionalized ceramic filter in a filtration process for hydrocarbons separations.

An embodiment of a process utilizing the present invention is illustrated in FIG. 4. Here, a hydrocarbon stream (1) is fed to a filtration unit (5) which contains one or more functionalized ceramic filter elements per the present invention. In preferred embodiments, the hydrocarbon stream (1) is comprised of heavy hydrocarbon feedstreams wherein the final boiling point the heavy hydrocarbon feedstream is greater than about 950° F. Such feedstreams include, but are not limited to, whole crudes, topped crudes, synthetic crude blends, shale oils, oils derived from bitumens, oils derived from tar sands, atmospheric resids, vacuum resids, as well as similar heavy hydrocarbon raw feedstocks, pipelineable intermediate products, or intermediate refining product streams containing components with a final boiling point greater than about 950° F.

Continuing with FIG. 4, the filtration unit (5) contains at least one multi-ring aromatic-diimide functionalized ceramic filter element (10) and the filtration unit (5) is comprised of a retentate zone (15) wherein the hydrocarbon feedstream contacts a first side of a permeable filter and a permeate zone (20), from which at least one permeate product stream (25) is obtained from the opposite or second side of the functionalized filter and such permeate product obtained is comprised of materials that selectively permeate through the filter (10).

Although it is not believed to be necessary to obtain the separations results shown herein, it is preferable that the pressure across the multi-ring aromatic-diimide functionalized filter element be above about 400 psi, especially when the hydrocarbon feedstream is comprised of heavy hydrocarbon components. It is believed herein that selective separation of certain stream components (including CCR) may be enriched at these higher filtration pressures. Preferably the pressure across the functionalized filter is at least 700 psi, more preferably at least 1000 psi, even more preferably at least 1200 psi, and most preferably at least 1500 psi. The preferred ranges of the pressure across the functionalized filter (or pressure drop) for operation of the present invention are about 400 to about 3000 psi, more preferably about 500 to about 2500 psi, even more preferably about 700 to about 1500 psi.

Also, in other preferred embodiments of the present invention, the temperatures of the heavy hydrocarbon feedstream when contacting the filter element(s) is from about 100 to about 350° C., and more preferably about 100 to about 300° C. For heavy hydrocarbon feedstreams containing a substantial portion of vacuum resids, the most preferable temperature is about 200 to about 300° C. The current invention can operate at feedstream temperatures above 350° C., but it is preferred that the feedstream be below a temperature wherein thermal cracking of the feedstream is minimized.

Continuing with FIG. 4, the current invention utilizes a filtration process to separate the feedstream into at least one permeate product stream (25) that is reduced in CCR content with respect to the feedstream and at least one retentate product stream (30) is drawn from the retentate zone (15) of the filtration unit (5) which is increased CCR content with respect to the feedstream. It should be understood that depending upon more complex arrangements such as multiple internal stages, series or parallel multiple unit operations, and/or filtration unit configurations knowledgeable to those skilled in the art, that more than one filtration element and/or filtration zone may be utilized and that more than one permeate product stream and/or retentate stream may be obtained from the filtration unit. Additionally, the retentate product stream, permeate product stream or any portions thereof may be recycled to the primary retentate zone or any intermediate retentate zone.

In a preferred embodiment, the hydrocarbon feedstream is flowed across the face of the filtration element(s) in a "crossflow" configuration. In this embodiment, in the retentate zone, the hydrocarbon feed contacts one end of the functionalized filter element and flows across the filter, while a retentate product stream is withdrawn from the other end of the retentate zone. As the feedstream/retentate flows across the face of the filter, a composition selective in compounds with reduced CCR content flows through the functionalized filter element to the permeate zone wherein it is drawn off as a permeate product stream. In a. cross-flow configuration, it is preferable that the Reynolds number in at least one retentate zone of the filtration unit be in the turbulent range, preferably above about 2000, and more preferably, above about 4000. In some embodiments, a portion of a retentate stream obtained from the filtration unit(s) may be recycled and mixed with the feedstream to the filtration unit prior to contacting a functionalized filter of the present invention.

These CCR reduced filtrated product streams produced are valuable feedstocks for additional upgrading processes in refinery and petrochemical plants. Conversely, the CCR reduced product streams can also be utilized to target specific processes wherein the decreased content of carbon or coke producing precursors may be beneficial. The current processes can also assist in debottlenecking or increasing the rate on hydrocarbon upgrading process units wherein the produced permeate stream herein does not require to additional upgrading or the extent of necessary upgrading is reduced.

Although the present invention has been described in terms of specific embodiments, it is not so limited. Suitable alterations and modifications for operation under specific conditions will be apparent to those skilled in the art. it is therefore intended that the following claims be interpreted as covering all such alterations and modifications as fall within the true spirit and scope of the invention.

The following examples provide more details as to the experiments and testing performed, as well as the data obtained from the experimentation. These examples are presented for illustrative purposes only and are not to be taken as limiting the present invention in any manner.

EXAMPLES

In preferred embodiments, the preparation of the functionalized ceramic filters of this invention proceeds as discussed in the Examples herein. First, aliphatic amines are grafted onto the surface of the unmodified ceramic substrate to act as anchoring sites for the subsequent attachment of the selective filtration layer. Second, the selective filtration layer is deposited onto or grown from the surface amine-modified ceramic substrate in a second step. The procedure for surface amine grafting presented herein may be utilized with adjustments by one of skill in the art for all of the functionalized ceramic filter examples and materials provided herein.

Surface Grafting of Aliphatic Amines on Ceramic Filters

A 47 mm diameter ceramic disk having an average pore size cutoff of approximately 8 kD was washed by repetitive and successive soaking in absolute ethanol and water at 60° C. for one hour, followed by drying under vacuum at 60° C.

The dried ceramic disk was transferred into a glass chamber under inert atmosphere, then attached to a vacuum manifold capable of vapor phase treatment at elevated temperature. The ceramic disk is evacuated and heated to 100° C. At 100° C. the ceramic disk was exposed to a vapor of ethylenediamine for one hour, re-evacuated, then exposed to a vapor of aliphatic aminosiloxane for one hour. Finally, the glass chamber holding the ceramic disk was evacuated to remove any remaining reactive vapors and cooled to room temperature for storage.

Example 1

Perylene Dianhydride Functionalized Ceramic Filter

In this Example, a functionalized ceramic filter was made as follows. In an inert atmosphere, a 200 ml wide mouth glass jar was charged with 0.05 grams of perylene anhydride (PDA) and 64 ml of m-cresol. A surface grafted amine-functionalized ceramic filter, prepared as described above, was mounted on a metal holder and placed in the glass jar so that the ceramic disk was suspended in the liquid phase with no contact with undissolved PDA on the bottom of the jar. The jar was sealed with a cap having a gas inlet fitting and heated to 90° C. under nitrogen for four hours, then at 130° C. overnight. Upon cooling, the ceramic disk was removed from the reaction mixture and washed with fresh m-cresol and acetone, then dried overnight in vacuum at 130° C.

Example 2

Copolymerization of Perylene Dianhydride and Hexamethylenediamine on a Functionalized Ceramic Filter in m-Cresol Solvent In this Example, a polyimide of perylene dianhydride and hexamethylenediamine was formed on a functionalized ceramic filter as follows. In an inert atmosphere, a 200 ml wide mouth glass jar was charged with 0.05 grams of PDA and 64 ml of m-cresol. A surface amine modified ceramic filter prepared as described above, was mounted on a metal holder and placed in the glass jar so that the ceramic disk was suspended in the liquid phase with no contact with undissolved PDA on the bottom of the jar. Afterward, 8.2 mg of hexamethylenediamine (HMDA) was charged to the solution, and the jar was then sealed with a cap having a gas inlet fitting and heated to 73° C. under nitrogen overnight. Upon cooling, the ceramic disk was removed from the reaction mixture and washed with fresh m-cresol and acetone, then dried overnight in vacuum at 130° C.

Fourier Transform Infrared Spectroscopy ("FTIR") was performed on PDA/HMDA polymer grafted onto the porous ceramic filter composition. The corresponding FTIR spectrum of the PDA/HMDA polymer film as synthesized is shown in FIG. 2. As can be seen in the FTIR, the presence of the strong aromatic bands and imide bands confirm the reaction of the polymer on the surface of the silica element. The lack of NH vibrations in the spectrum also indicates that essentially all of the free amines have reacted to form imide or amic acid species.

Example 3

Copolymerization of Perylene Dianhydride and Hexamethylenediamine on a Functionalized Ceramic Filter in Pyridine Solvent In an inert atmosphere, a 200 ml wide mouth glass jar was charged with 0.085 grams of PDA, 0.102 grams of HMDA, and 95 ml of pyridine. A surface amine modified ceramic filter prepared as described above, was mounted on a metal holder and placed in the glass jar so that the ceramic disk was suspended in the liquid phase with no contact with undissolved PDA on the bottom of the jar. The jar was then sealed with a cap having a gas inlet fitting and heated to 80-86° C. under nitrogen overnight. Upon cooling, the ceramic disk was removed from the reaction mixture and washed with fresh pyridine and acetone, then dried overnight at 130° C.

These examples illustrate the polymer formation and physical integration of the amine-functionalized perylene polymer with a ceramic surface.

Example 4

In this Example, a functionalized ceramic filter of an embodiment of the present invention was performance tested against the same ceramic filters that were unmodified.

Here, a functionalized ceramic filter as made using a 47 mm diameter, 8 kD ceramic filter disc and functionalizing one surface of the filter with a PDA/HMDA polymer as per the procedures described in Example 2. For a baseline, the same 8 kD ceramic filter without any surface treatment was utilized in the testing of this Example. The average pore size of the ceramic filter elements was estimated to be from about 0.005 to about 0.010 μm. The functionalized filter was tested, as well as a comparative ceramic filter disc that has not been modified. under filtration conditions as follows.

Figure 5:
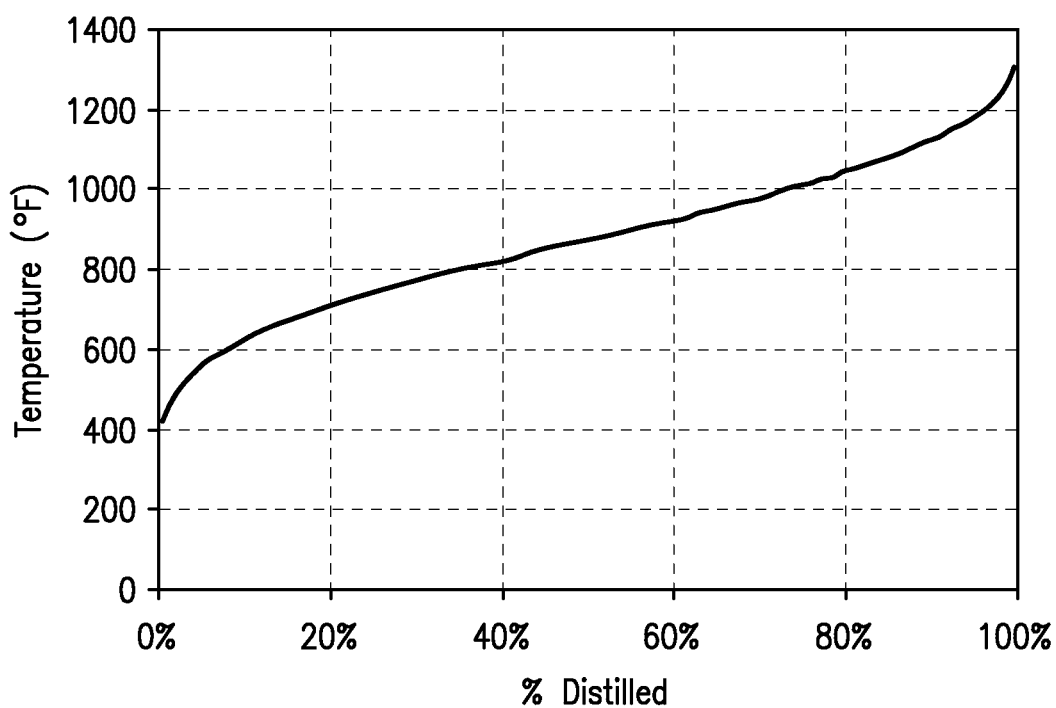
FIG. 5 shows the simulated distillation of the heavy hydrocarbon feed sample utilized in the examples herein.

The filters were subjected to contact with a heavy hydrocarbon feed. In the case of the polymer functionalized (PDA/HMDA) filter of Example 2, the heavy hydrocarbon feed was in contact with the polymer side of the functionalized filter. The heavy hydrocarbon feed was a heavy refinery intermediate stream material, having a typical boiling endpoint of greater than about 1000° F. and a CCR of 3.1 wt %. The simulated distillation of the heavy hydrocarbon feed used in this example is shown in FIG. 5. The feed side (i.e., retentate side or high pressure side) of the multi-ring aromatic-diimide functionalized filter element was subjected to 1000 psi of pressure across the filter element, with the permeate side (i.e., opposite side or low pressure side) of the filter element being held at approximately atmospheric pressure, while the feed on the retentate side of the filter element was constantly stirred.

These filtration tests were run on both the unmodified ceramic filter and the multi-ring aromatic-diimide polymer functionalized (PDA/HMDA) filter at feed temperatures of 200° C., 250° C., and 300° C. The results are shown graphically in FIG. 6. In FIG. 6, the solid line represents a best fit of the testing data from the unmodified ceramic filter at the various temperatures. FIG. 6 also shows the CCR Selectivity vs. Flux data points for the three feed temperatures tested.

The units of the Flux are in gallons of permeate per square foot f filter area per day (GFD). The CCR Selectivity is the CCR content of the feed less the CCR content of the permeate divided by the CCR content of the feed expressed as a percentage. As can be seen in FIG. 6, the multi-ring aromatic-diimide polymer functionalized (PDA/HMDA) ceramic filter of the present invention provided better performance than the unmodified ceramic filter under all conditions tested. The relative increase in selectivity of the functionalized filter over the unmodified filter ranged from about 68% at 300° C. and 27% at 200° C.

Additionally, no significant decay in flux or selectivity was observed under 300 hours of continuous testing. This high stability of the multi-ring aromatic-diimide functionalized filters of invention is believed to be due to the unique and integral anchoring of the select polymers to the ceramic filter element as disclosed herein.

What is claimed is:

1. A process for separating a heavy hydrocarbon comprised of:
   a) contacting a first side of a functionalized filter located in a filtration unit with a heavy hydrocarbon stream having a final boiling point above 950° F.;
   b) obtaining a permeate from a second side of the functionalized filter, wherein the permeate has passed from the first side of the functionalized filter to the second side of the functionalized filter by passing the permeate components through the functionalized filter, and wherein the permeate has a lower Conrad Carbon Residue (CCR) content than the heavy hydrocarbon stream; and
   c) obtaining a retentate from the first side of the functionalized filter, wherein the retentate has a higher Conrad Carbon Residue (CCR) content than the heavy hydrocarbon stream;
   wherein the functionalized filter is comprised of a ceramic filter element and a polymer layer comprised of multi-ring aromatic imides, multi-ring aromatic diimides, or a combination thereof;
   wherein at least a portion of the multi-ring aromatic imides or multi-ring aromatic diimides are chemically linked to the ceramic filter element via siloxane groups and are chemically linked to each other in the polymer layer by an organic linking monomer comprised of from about 1 to about 12 carbon atoms;
   wherein the organic linking monomer is selected from the group consisting of hexamethylene diamine, phenylene diamine, methylene dianiline, methylene di-o-chloroaniline, 2,3,5,6-tetramethyl-1,4-phenylene diamine, methylene di-o-chloroaniline, methylene bis(dichloroaniline), methylene dichlorocyclohexylamine, 4,4'-(hexafluoro-isopropylidene)-bisaniline, 3,3'-diaminophenyl sulfone, 4,4'-diaminophenyl sulfone, 2,4-diamino cumene, methyl bis(di-o-toluidine), oxydianiline, bisaniline A, bisaniline P, bisaniline M, 2,2-bis[4-(4-aminophenoxy)phenyl]propane, 4,4'-bis(4-aminophenoxy)biphenyl, diaminocyclooctane, tetramethylenediamine, hexamethylenediamine, octamethylenediamine, decamethylenediamine, aminomethylcyclooctylmethanamine, 1,5-diaminonaphthalene, 1,8-diaminonaphthalene, 4,4'-diaminodiphenylsilane, 2,2'-bis(trifluoromethyl)benzidine, 1,2-diaminobenzene, 1,3-diaminobenzene, 1,4-diaminobenzene, 2,5-dimethyl-1,4-diaminobenzene, 2-(trifluoromethyl)-1,4-phenylenediamine, 5-(trifluoromethyl)-1,3-phenylenediamine, 4,4'-diaminobenzophenone, 3,4'-diaminobenzophenone, 3,3'-diaminobenzophenone, xylylene diamine, 4-aminophenyl-3-aminobenzoate, 2,4-diaminotoluene, 2,5-diaminotoluene, 2,6-diaminotoluene, 2,4-diamino-6-chlorotoluene, 4-chloro-1,3-phenylenediamine, 2,4,6-trimethyl-1,3-diaminobenzene, 2,2'-bis-(4-phenoxy aniline)isopropylidene, 4,4'-trifluoromethyl-2,2'-diaminobiphenyl, 4,4'-thio-bis-[(2-trifluoromethyl)benzene amine, 9,9-bis(4-aminophenyl)-fluorene, 1,3-diamino-2,4,5,6-tetrafluorobenzene, 4,4'-diaminobenzanilide, o-tolidine sulfone, o-tolidine disulfonic acid, 4,4'-diamino-3,3'-dicaarboxy-diphenyl methane, 9,9'-bis(4-aminophenyl)fluorene, diaminodurene, 3,3'5,5'-tetramethylbenzidine, and 1,3-diamino-2,4,5,6-tetrafluorobenzene; and
   wherein the permeate components passes through at least a portion of the polymer layer and at least a portion of the ceramic filter element.

2. The process of claim 1, wherein the heavy hydrocarbon stream in the filtration unit is from about 100 to about 350° C.

3. The process of claim 2, wherein the pressure differential across the functionalized filter is at least 400 psig.

4. The process of claim 3, wherein the heavy hydrocarbon stream is comprised of a process stream selected from a whole crude, a topped crude, a synthetic crude blend, a shale derived oil, an oil derived from bitumen, and an oil derived from tar sands.

5. The process of claim 4, wherein the pressure differential across the functionalized filter is from about 500 to about 2500 psi.

6. The process of claim 1, wherein the functionalized filter is contacted with the heavy hydrocarbon stream in a retentate zone of the filtration unit and wherein the heavy hydrocarbon stream flows across the face of the first side of the functionalized filter in a cross-flow configuration.

7. The process of claim 6, wherein the Reynolds number in the retentate zone is above about 4000.

8. The process of claim 1, wherein at least a portion of the multi-ring aromatic imides or multi-ring aromatic diimides are chemically linked to the siloxane groups of the ceramic filter element via an organo-amine anchoring monomer.

9. The process of claim 1, wherein the polymer layer is comprised of multi-ring aromatic diimides and the multi-ring aromatic diimides are resultant from the condensation reaction of an organic linker molecule with multi-ring aromatic dianhydrides selected from the group consisting of perylene-3,4,9,10-tetracarboxylic dianhydride; phenanthrene-1,8,9,10-tetracarboxylic dianhydride; 2,3,6,7-naphthalene tetracarboxylic dianhydride; 1,2,5,6-naphthalene tetracarboxylic dianhydride; 1,4,5,8-naphthalene tetracarboxylic dianhydride; 2,2',3,3'-biphenyl tetracarboxylic dianhydride; and 2,3,3',4'--biphenyl tetracarboxylic dianhydride.

10. The process of claim 8, wherein the organo-amine anchoring monomer is one or more aminosiloxane reagents selected from the group consisting of aminoalkyl trialkoxysilane, aminoalkyl methyldialkoxysilane, aminoalkyl dimethylalkoxysilane, N-(2-aminoethyl)-aminoalkyltrialkoxysilane, N-(2-aminoethyl)-(aminoalkyl)methyldialkoxysilane, N-(2-aminoethyl)-(aminoalkyl)dimethylalkoxysilane, diethylenetriaminetrialkoxysilane, diethylenetriaminemethyldialkoxysilane, diethylenetriaminedimethylalkoxysilane, aminophenyltrialkoxysilane, aminophenylmethyldialkoxysilane, aminophenyldimethyl-alkoxysilane, wherein the aminoalkyl and alkoxy groups have 1 to 20 carbon atoms in either linear, branched, or cyclic structures, the aminoaryl group is selected from aminophenyl, aminobenzyl, and aminoalkylphenyl, and the amine is selected from primary amines and secondary amines.

11. The process of claim 1, wherein the ceramic filter element is comprised of a material selected from the group consisting of clays, titania, silica, alumina, cordierite, ferric oxide, boron nitride, zirconia, zeolitic materials, glass, and SiC.

12. The process of claim 11, wherein the ceramic filter element has a pore size cutoff rating from about 2 to about 20 kiloDaltons (kD).

13. The process of claim 11, wherein the ceramic filter element has an average pore size from about 0.001 to about 0.020 microns (µm).

\* \* \* \* \*